US007052213B2

(12) United States Patent
Mendenhall

(10) Patent No.: US 7,052,213 B2
(45) Date of Patent: May 30, 2006

(54) HYDRAULIC FOOD CUTTER WITH IMPROVED ACCELERATOR TUBE ASSEMBLY

(76) Inventor: George A. Mendenhall, 4252 S. Eagleson Rd., Boise, ID (US) 83705

( * ) Notice: Subject to any disclaimer, the term of this patent is extended or adjusted under 35 U.S.C. 154(b) by 42 days.

(21) Appl. No.: 10/829,088

(22) Filed: Apr. 20, 2004

(65) Prior Publication Data

US 2005/0232709 A1 Oct. 20, 2005

(51) Int. Cl.
*B65G 53/54* (2006.01)

(52) U.S. Cl. ...................................... 406/196; 406/195

(58) Field of Classification Search .................. 406/86, 406/195, 196; 83/402
See application file for complete search history.

(56) References Cited

U.S. PATENT DOCUMENTS

| | | | | |
|---|---|---|---|---|
| 2,733,105 | A * | 1/1956 | Williams | 406/195 |
| 3,144,276 | A * | 8/1964 | Ortiz | 406/155 |
| 3,310,349 | A * | 3/1967 | Tilley et al. | 406/171 |
| 3,321,891 | A * | 5/1967 | Coanda | 96/17 |
| 4,082,024 | A * | 4/1978 | Hodges et al. | 83/402 |
| 4,361,079 | A * | 11/1982 | Christensen et al. | 454/172 |
| 4,614,141 | A * | 9/1986 | Mendenhall et al. | 83/402 |
| 5,179,881 | A * | 1/1993 | Frey et al. | 83/98 |
| 5,390,590 | A * | 2/1995 | Mendenhall | 995/537 |
| 5,433,250 | A * | 7/1995 | Mendenhall | 137/874 |
| 5,568,755 | A * | 10/1996 | Mendenhall | 83/402 |
| 5,806,397 | A * | 9/1998 | Mendenhall | 83/402 |
| 6,129,624 | A * | 10/2000 | Niklason | 452/106 |
| 6,729,218 | B1 * | 5/2004 | Somsen | 83/402 |
| 6,805,030 | B1 * | 10/2004 | Englar et al. | 83/402 |

* cited by examiner

*Primary Examiner*—Joe Dillon, Jr.
(74) *Attorney, Agent, or Firm*—Frank J. Dykas; Dykas, Shaver & Nipper, LLP

(57) ABSTRACT

A hydraulic accelerator tube is provided for an improved hydraulic food cutting assembly. The accelerator tube is formed of polyurethane having a durometer hardness within the range of 20–70. It is encased within a clamshell housing which, when installed in the food cutting assembly, locks in position an inlet flange and an outlet flange which are formed integrally with the accelerator tube. Stiffening ribs are provided and are also formed integrally with the accelerator tube.

30 Claims, 6 Drawing Sheets

HYDRAULIC FOOD CUTTER WITH IMPROVED ACCELERATOR TUBE ASSEMBLY

BACKGROUND OF THE INVENTION

1. Field of the Invention

The present invention generally relates to accelerator tubes used in hydraulic food cutters, and more particularly relates to improved flexible accelerator tubes.

2. Background Information

Hydraulic food cutting apparatus have been known and used commercially for over thirty years. Their general principles of operation are well known. Food pieces to be cut, typically potatoes, are dropped into a feed tank containing water. The water, with the entrained potatoes, is then pumped into a pipe and into the front half of a venturi where the potatoes are accelerated to velocities of approximately forty to sixty feet per second. At the narrowest point of the venturi, a fixed array of cutting blades is positioned, and as the food product impinges upon the blade it is cut into a plurality of smaller pieces, for example french fry pieces cut from whole potatoes. The cut food pieces then enter the second half of the venturi where they are decelerated and deposited upon a chain conveyor of some sort wherein the water passes through and the cut food pieces are separated from the water. The water is then recycled back to the feed tank for further use. The cut food pieces are then conveyed on for further processing as appropriate.

While the concept is simple, its execution in practice is far more difficult. The commercial value of the cut food pieces is dependent upon the quality of the cuts. Broken or irregular cut food pieces have less commercial value and as a result continuous work has been done over the years to improve the quality of the cut food pieces coming out of a hydraulic cutter.

While there are a wide variety of food products that are cut using hydraulic food cutters, the predominant use is for cutting potatoes, and as such will be used as an example of some of the problems encountered when attempting to cut food product into pieces. However, it should be distinctly understood that the use of potatoes is for illustrative purposes only, and by no means is intended to limit the scope of the present invention. Other products that can and are cut with hydraulic food cutters include other vegetables, such as onions, carrots, beets, and even mushrooms, as well as fruits.

The cellular structure of a potato is relatively rigid and a lot of starch is present. When the potato impinges upon the cutting blade within the fixed array, the cutting forces tear apart cell structures, and considerable frictional forces are encountered. Given the fact that the hydrodynamic forces within the cutter assembly are very difficult to accurately model, new designs are usually the result of trial and error testing. A poor design can leave food products and cut pieces tumbling and colliding with each other or walls of the hydraulic food cutter causing numerous broken pieces to be created. Additionally, it is believed that the frictional forces encountered by the potato and the partially formed cut food pieces induce shear forces in the cut food pieces resulting in a condition known as feathering wherein the cut potato pieces, particularly french fries, may come out of the hydraulic food cutter with a plurality of smaller feather cuts generally oriented forty-five degrees to one or more corners of the french fry. Also, the uncut food product itself may not be perfectly aligned with the array of cutters, thus resulting in misaligned cut food pieces.

A number of steps have been taken to improve the quality of the cuts. One of these is that the potatoes are preheated and/or the feed water is preheated. Preheating has been found to reduce the number of misaligned cuts, broken pieces, and feather cuts. Another improvement is the introduction of the accelerator tube in the converging portion of the venturi immediately in front of the fixed array of cutter blades. These accelerator tubes are frustoconical in shape, and come in a variety of sizes and interior diameters, which are sized for the particular size of food product being cut. Accelerator tubes serve the function of accelerating the food product prior to impingement upon the fixed array of cutter blades and also to align and sequence the food product to minimize tumbling.

Typical prior art accelerator tubes are made of rigid natural rubber and are held in place at a discharge end by means of pneumatically controlled alignment shoes to minimize the wobble of the discharge end of the accelerator tube as the uncut food product is ejected out the discharge end and into the cutter blades. A typical prior art accelerator tube assembly can be seen in U.S. Pat. No. 5,568,755. While the use of a prior art accelerator tube improves the quality of the cut food pieces, the prior art accelerator tubes have by no means provided a complete and satisfactory solution to quality problems. One of the primary problems with these prior art accelerator tubes is that the uncut food products are not of uniform size, and one size accelerator tube does not fit all. If an oversized uncut food product is propelled through the accelerator tube, it will expand the cylindrical wall of the accelerator tube at the discharge end, and thereby force the accelerator tube to engage the guide arms. This produces a wobble in the accelerator tube and the uncut food product being ejected from its discharge end, which can seriously degrade the quality of the cut food pieces. Another problem with the existing prior art accelerator tubes is that they are relatively rigid and inflexible, and the uncut food product that is too large for the accelerator tube may not be able to pass through it, but rather jam inside it. At cutting rates of 30,000–60,000 pounds of potatoes per hour, it does not take but a few seconds for a jammed potato in the discharge end of an accelerator tube to cause a plug up of mashed and damaged potatoes in the feed line that may take hours to remove and clean up.

Another problem with the prior art hydraulic food cutters and accelerator tubes is that the accelerator tubes have to be fixedly attached in the feed line, which is usually accomplished by bolting a flange of the accelerator tube to a fixed structure on the hydraulic food cutter. The same is true for the cutter head assembly containing the arrays of fixed blades. It is a common practice in the potato processing industry to replace the cutter blade assembly for purposes of replacing or sharpening the blades after six to eight hours of use. It is also common practice in the prior art to periodically change and/or replace accelerator tubes as they wear or need to accommodate various sizes of uncut food product being processed. Both of these operations, in the prior art, are time consuming and therefore expensive in terms of production downtimes.

Accordingly, what is needed is a new, improved accelerator tube that further reduces induced wobble or tumbling in the uncut food pieces, but is flexible enough to allow the passage of oversized uncut food pieces, thus to minimize plugging problems. What is also needed is a means for replacing the accelerator tube within the hydraulic food cutter with minimal downtime for the cutter assembly.

Additional objects, advantages and novel features of the invention will be set forth in part in the description which follows and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

These objects are achieved through a design for an improved accelerator tube and a housing assembly used to lock it in place. This design includes an accelerator tube that is formed of rubber, preferably polyurethane, and having a durometer hardness within the range of twenty to seventy. There are a number of natural, synthetic, or modified high polymers with elastic properties that, after vulcanization, will have the necessary flexibility and elastic recovery properties that will work. The accelerator tube is formed of a conical tube which has a larger inlet end, and a smaller discharge end. The accelerator tube is also provided with an inlet flange which circumvolves the conical tube at the inlet. Also provided in the general area of the inlet is a seat flange which is generally frustoconical in shape. At the opposite end, or outlet end, there is provided an outlet flange which has a plurality of outlet flange sealing rings. Also provided are a plurality of circumvolving reinforcement spacing rings.

The accelerator tube is configured to be encased within a housing formed of a right housing half and a left housing half, which in the preferred embodiment are interconnected by means of a piano hinge such that the housing opens like a clamshell for purposes of quickly inserting or removing an accelerator tube. The right and left housing halves are each provided within sealing surface collars which will seal against the inside surfaces of the inlet and outlet flanges respectively. A seating collar is also provided in the housing and is configured to engage the seat flange of the accelerator tube. The purpose of the seat flange and the seating collar is to align the accelerator tube within the housing formed of the closed housing halves such that the longitudinal, centerline of the accelerator tube coincides with the longitudinal centerline of the assembled housing. The housing halves are configured to mate up and seal against the inside surfaces of the inlet and outlet flanges.

Once the accelerator tube is positioned in either half of the housing, the left and right housing halves are then swung closed by the operator using a pair of handles. The assembled housing and accelerator tube are then ready for insertion into a hydraulic cutter where they will be placed in compressive, sealed engagement with a cutter assembly and a compression collar.

A basic frame for a hydraulic food cutter is formed of a base pan, sides, and a hinged top cover supported by leg assembly. The frame assembly for the hydraulic food cutter is designed to hold, in compressive and sealed engagement, a cutter assembly, the housing for the accelerator tube between a compression plate at the discharge end and a slideable compression collar at the inlet end of the hydraulic food cutter.

Also provided is a pair of pneumatic cylinders operable to move cylinder rods which are attached to the compression collar. When the compression collar is withdrawn, it releases any compressive forces on the accelerator tube housing and the cutter assembly and provides sufficient clearance for an operator to reach in through the open top cover to insert or remove either or both the cutter assembly and the accelerator tub housing halves.

To seal the assembly, the pneumatic cylinders are activated to push the compression collar against the inlet sealing surface flanges formed on the inlet end of right and left housing halves. When it does so, it engages and traps, between the compression collar and the inlet seal surface flanges the inlet flange of the accelerator tube into a compressive, water tight seal. Concurrently, the accelerator tube and right and left housing halves are pushed forward and into engagement with the rear cutter assembly sealing collar, and in turn the cutter assembly is pushed forward into compressive engagement with the compression plate. Attached to the compression plate is an outlet coupler, which is interconnected to the remainder of the piping system.

Thus, when the pneumatic cylinder is engaged to force the compression collar forward, a number of additional things occur. First, watertight seals are formed between the various modules in preparation for use of the hydraulic food cutter. Secondly, and more importantly, the outlet flange of the accelerator tube is held in locked, compressive engagement between outboard sealing surface flanges of the right and left housing halves and the rear cutter assembly sealing collar. Not only does this provide a watertight seal, but it also locks the outlet of the accelerator tube in position. Thus, the accelerator tube is supported at its inlet end by means of the inlet flange held in compressive engagement against the appropriate surfaces of right and left housing halves and the compression collar, and by the outlet flange being held in compressive engagement at the opposite end of the housing. Elsewhere throughout the housing, the accelerator tube is not supported other than by its own material structure. In this manner, the conical tube is free to expand and contract as it encounters uncut food product of various sizes and dimensions passing through it, thus, greatly reducing the potential for plugging the accelerator tube with uncut food product. Also, this same freedom of movement and the resilient materials of which the accelerator tube is formed give it freedom of movement to expand and contract to contain and align tumbling uncut food product of various sizes entering the inlet of the accelerator tube.

Reinforcement spacer rings are also provided and formed integral with the conical tube. The reinforcement spacers serve a number of functions. They provide additional structural strength to enable the use of more flexible materials as described above. They all so serve to limit lateral deflection of the accelerator tube when a misaligned or oversized food product passes through the accelerator tube. They are also appropriately sized so as to provided uniform spacing of reinforcement spacer tips with the interior surfaces of the housing halves so as to limit the amount of permissible tube deflection. The actual spacing between the ring tips and the interior surfaces of the housing halves is a matter of design choice related to the strength and flexibility of the material from which the accelerator tube is fabricated and the uniformity of size of the food product being cut. Also, the size of the spacers can be can be increased or decreased to maintain the same distance between the ring tips and the interior surfaces of the housing halves to facilitate the use of accelerator tubes having different interior diameters within the same housing halves.

Still other objects and advantages of the present invention will become readily apparent to those skilled in this art from the following detailed description wherein I have shown and described only the preferred embodiment of the invention, simply by way of illustration of the best mode contemplated by carrying out my invention. As will be realized, the invention is capable of modification in various obvious respects all without departing from the invention. Accordingly, the drawings and description of the preferred embodiment are to be regarded as illustrative in nature, and not as restrictive in nature.

DESCRIPTION OF THE PREFERRED EMBODIMENTS

Figure 1:
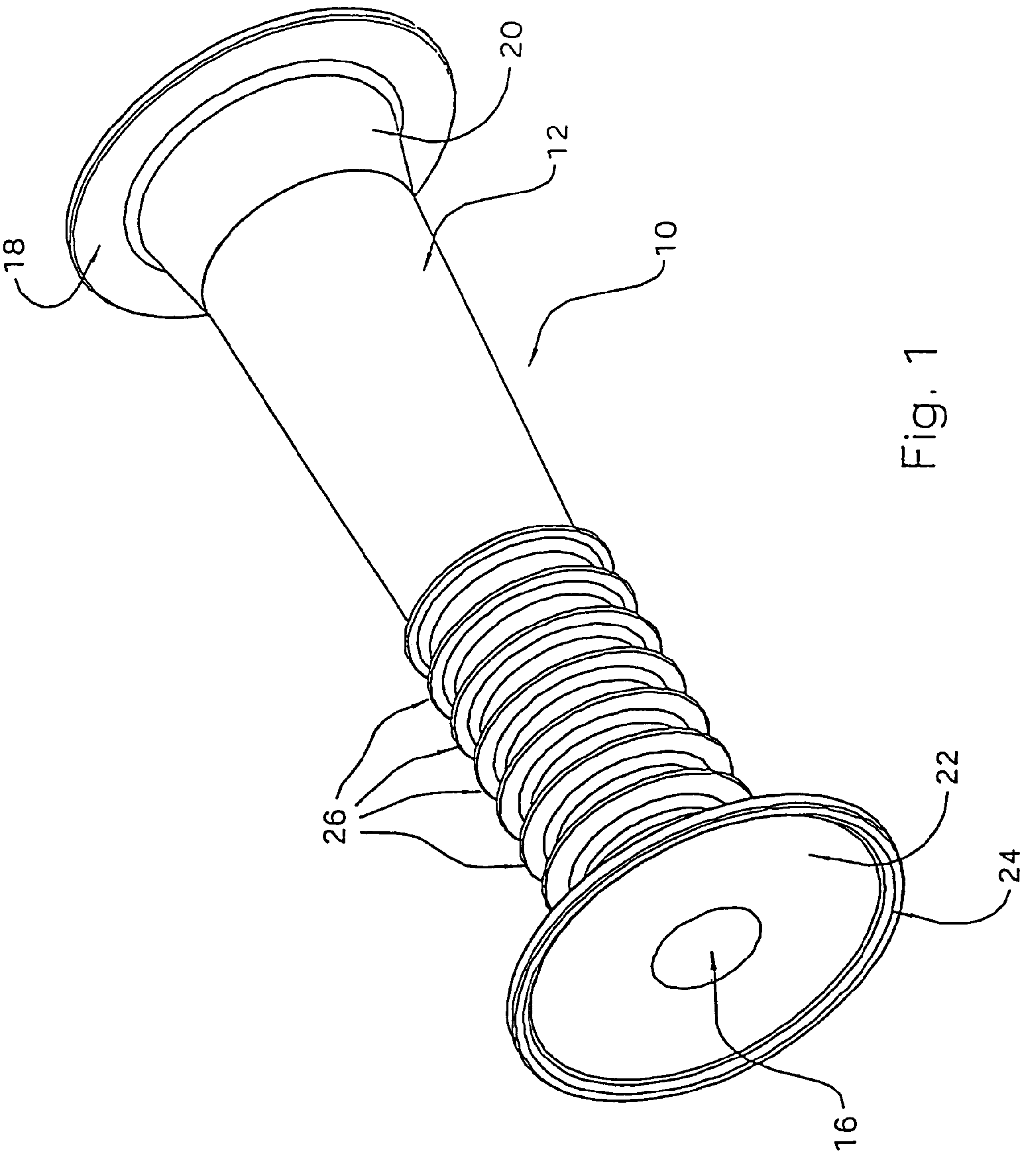
FIG. 1 is perspective, representational view of the improved accelerator tube.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

Figure 3:
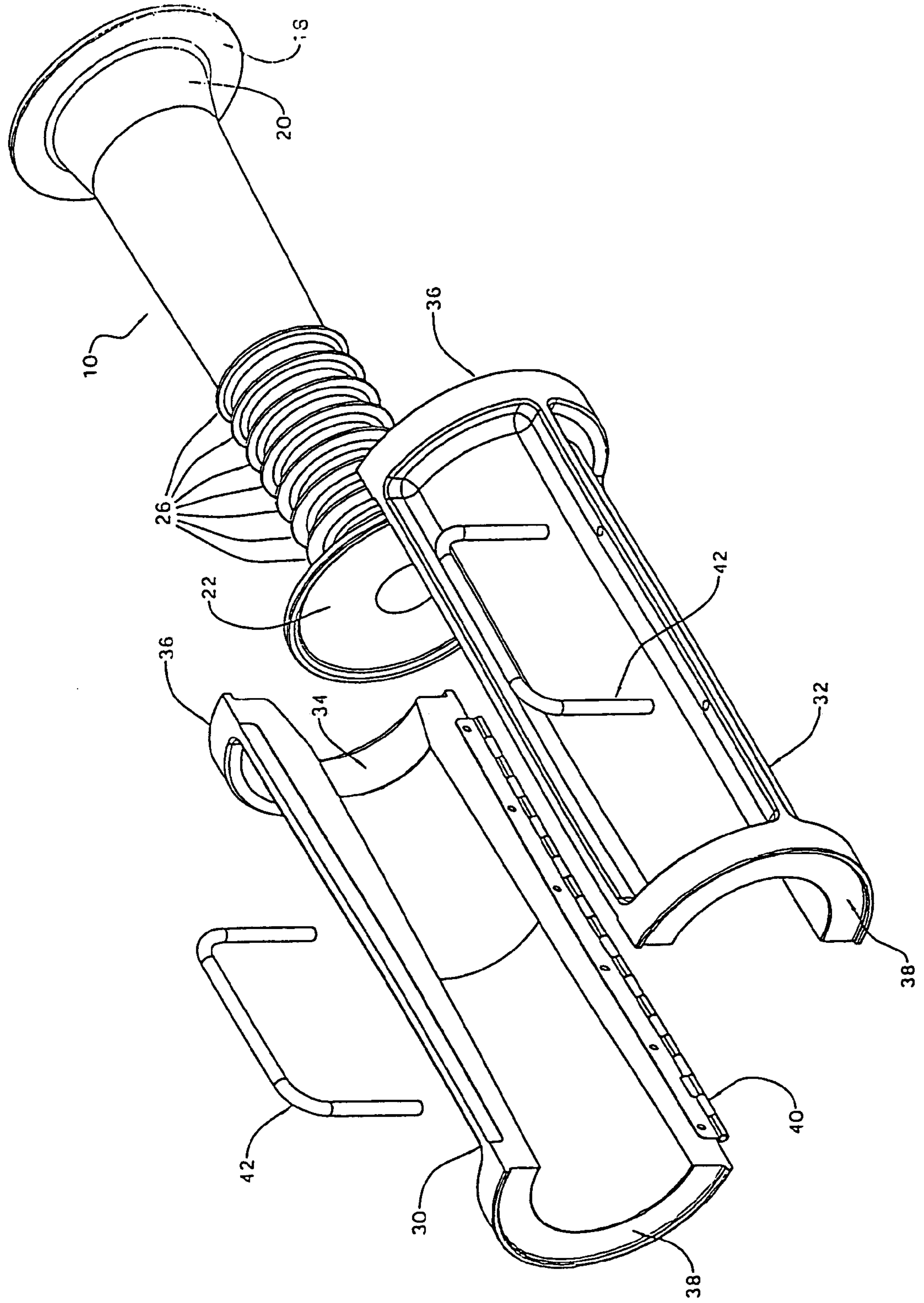
FIG. 3 is an exploded, perspective, representational view of the improved accelerator tube and the left and right housing halves.
Figure 4:
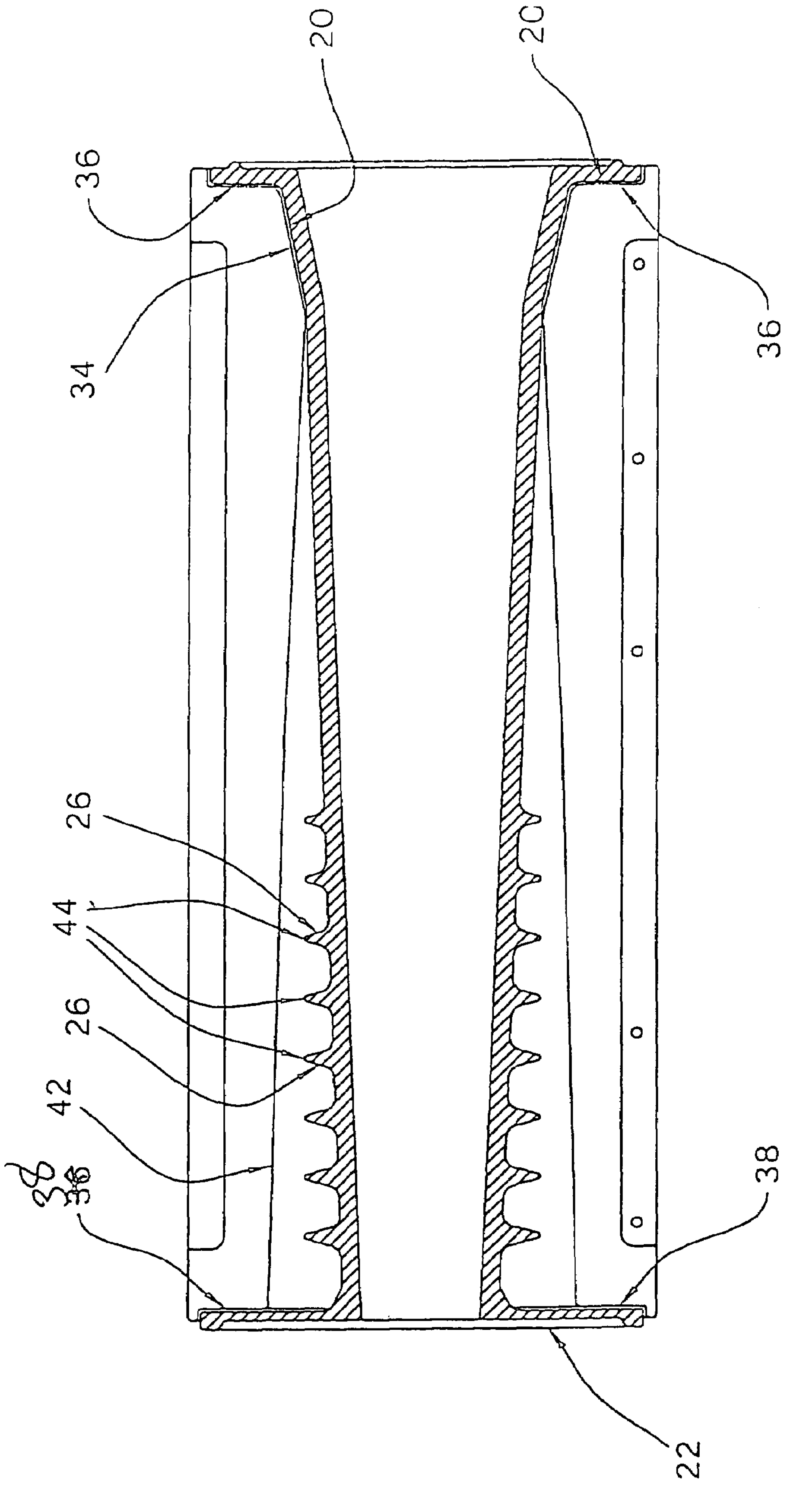
FIG. 4 is a sectional, representational view of the improved accelerator tube held fitted within a housing half.
Figure 5:
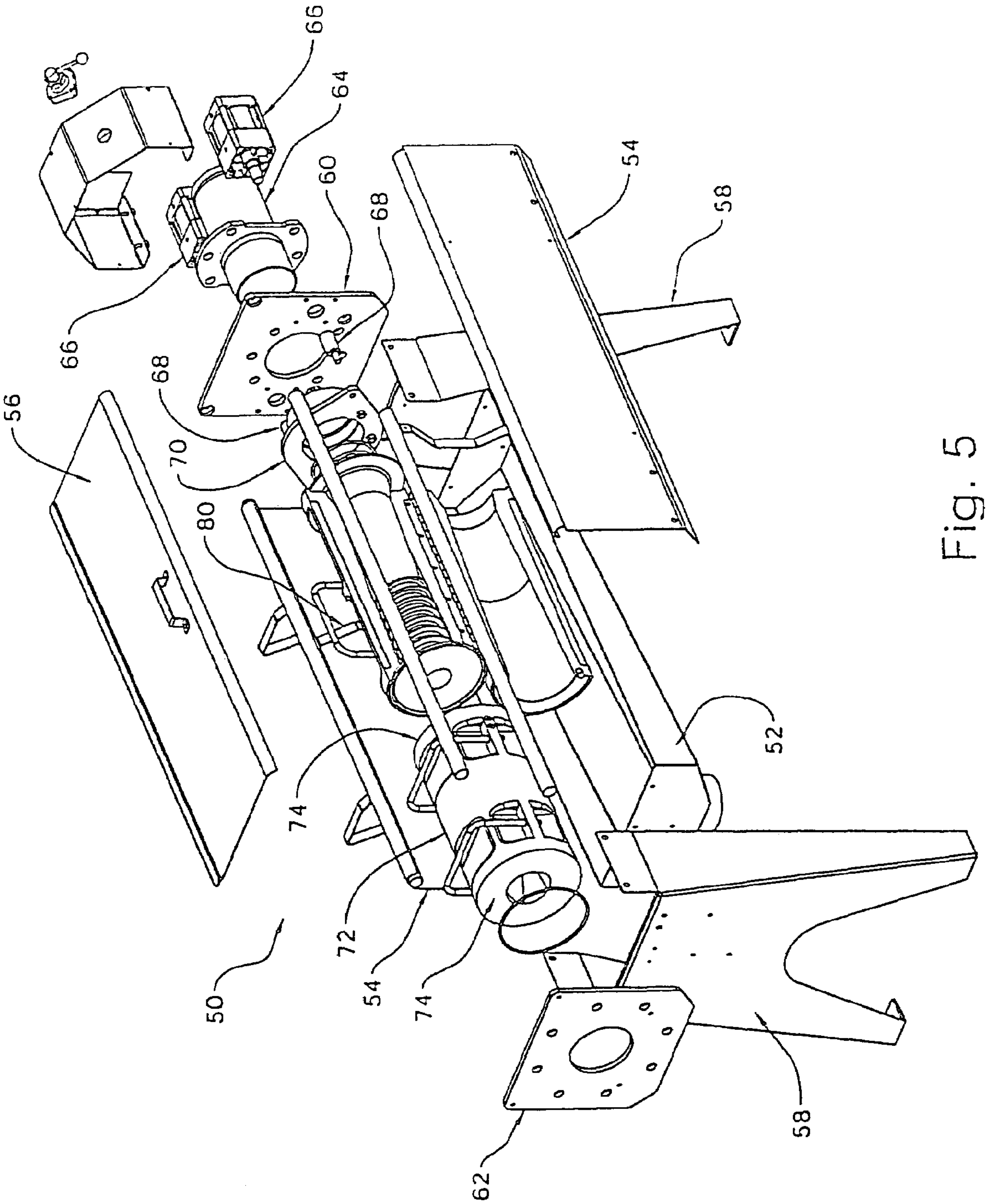
FIG. 5 is an exploded, perspective, representational view of my new design for a hydraulic food cutter, which incorporates the improved accelerator tube.
Figure 6:
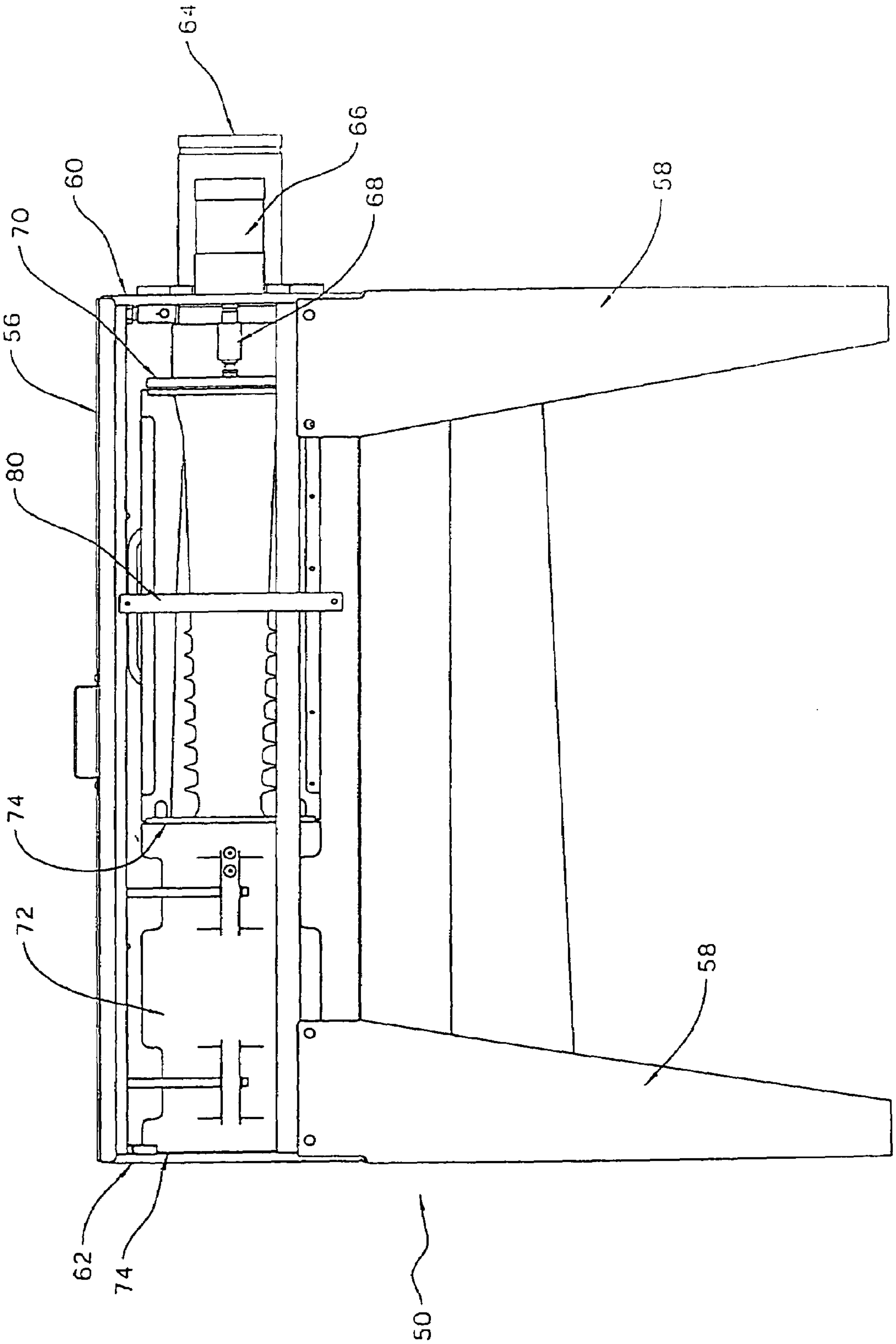
FIG. 6 is a sectional, side view of the assembled hydraulic food cutter.

FIGS. 1–4, show my new, improved accelerator tube 10 and the housing assembly used to lock it in place within my new design for a hydraulic cutter assembly 50 which is shown in FIGS. 5 and 6.

Figure 2:
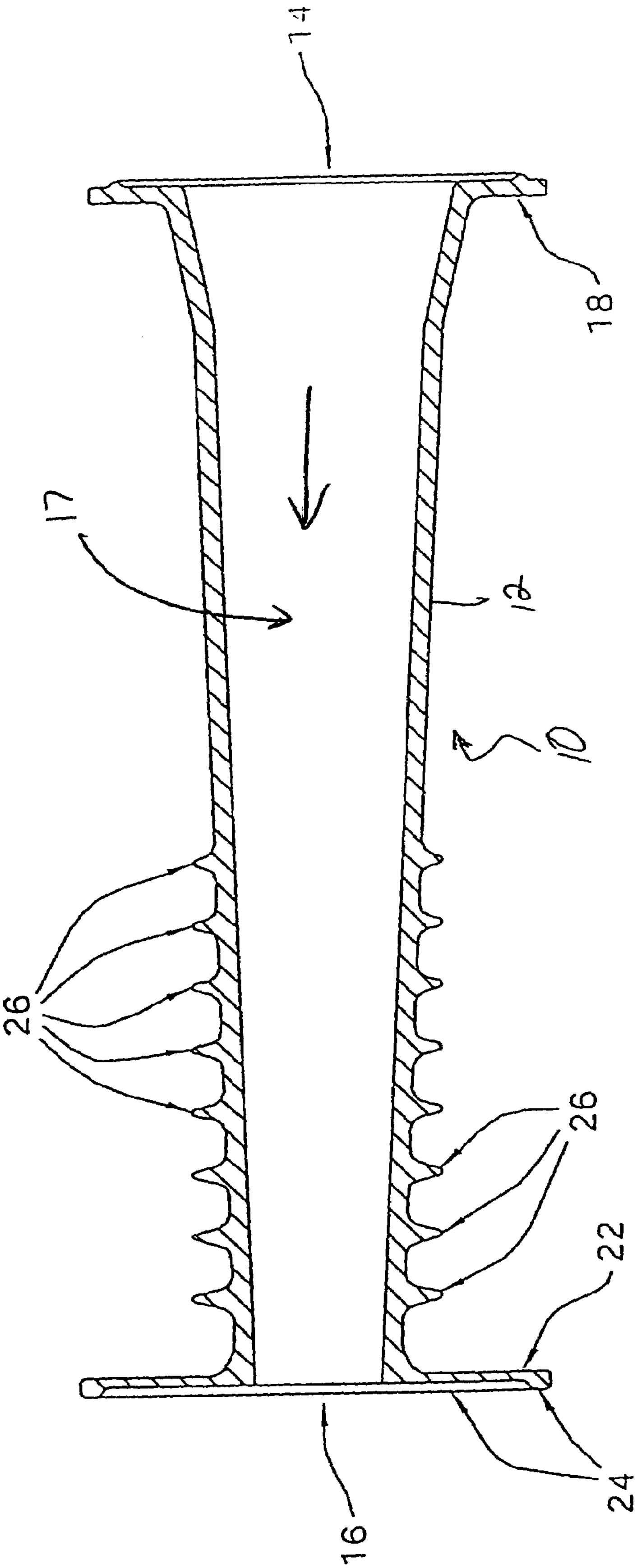
FIG. 2 is a sectional, side view of the improved accelerator tube.

First, referring to FIGS. 1 and 2, shown is accelerator tube 10 that is formed, in the preferred embodiment, of polyurethane, and has a durometer hardness within the range of twenty to seventy. There are a number of natural, synthetic, or modified high polymers with elastic properties that, after vulcanization, will have the necessary flexibility and elastic recovery properties that will work. In practice, in the preferred embodiment, it is found that an accelerator tube 10 formed of molded polyurethane having a durometer hardness of approximately fifty seems to produce optimal results. Accelerator tube 10 is formed of frustoconical tube 12, also referred to as conical tube 12, and has a larger inlet end 14, and a smaller discharge end 16. The interior of accelerator tube 10 forms a passageway 17. In the preferred embodiment, objects are conveyed through passageway 17 from inlet end 14 to discharge end 16 as shown by the arrow in FIG. 2. In the preferred embodiment accelerator tube 10 is also provided with an inlet flange 18 which circumvolves conical tube 12 at inlet 14. The exact location is a matter of design choice, as it could just as easily be farther inward, so as to allow the inlet end of the accelerator tube to extend a little bit upstream into a connecting coupler or even the connected piping. Also provided in the general area of the inlet 14 is seat flange 20, which is generally frustoconical in shape and is used to center conical tube 12. At the opposite end, or outlet end 16, there is provided an outlet flange 22 which has at least one outlet flange sealing ring 24. Also provided are a plurality of circumvolving reinforcement spacing rings 26, whose functions are hereinafter described.

As shown in FIGS. 3 and 4 accelerator tube 10 is configured to be encased within a housing formed of right housing half 30 and left housing half 32, which in the preferred embodiment are interconnected by means of piano hinge 40 such that the housing opens like a clamshell for purposes of quickly inserting or removing accelerator tube 10. Right and left housing halves 30, 32 are each provided within inlet sealing surface collar 36 and outlet sealing surface collar 38 which will seal against the inside surfaces of inlet flange 18 and outlet flange 22 respectively. A seating collar 34, is also provided and is configured to engage seat flange 20 of accelerator tube 10 as is shown in FIG. 4. The purpose of seat flange 20 and the seating collar 34 is to align accelerator tube 10 within the housing formed of closed housing halves 30, 32 such that the longitudinal, centerline of accelerator tube 10 coincides with the longitudinal centerline of the assembled housing. The housing halves 30, 32 are configured to mate up and seal against the inside surfaces of inlet flange 18 and outlet flange 22.

It should be pointed out that there are alternative designs to this preferred embodiment for the accelerator tube housing. The housing does not have to be formed of two halves closing in clam shell like fashion. It could be fabricated with a smaller access door which may or may not be hinged. It could be formed as a unitary piece wherein an accelerator tube is simply inserted through the hole, however in such case, the accelerator tube would have to be very elastic. The point is, that the accelerator tube is held within a case wherein inlet and outlet flanges are positioned against a sealing surface, so that when the housing is place in compressive engagement with a hydraulic cutting assembly, the flanges will lock the accelerator tube in position and form watertight seals against the housing.

In a like manner, the design for seating collar 34 is merely a matter of design choice. Other designs may work just as well, including altering all or part of the contour of the inner surface of the housing to space it away from the frustoconical tube 12 to create the expansion space needed for the flexible conical tube to 12 expand into. With the right materials for the conical tube, it is even possible to eliminate the seating collar altogether even though adopting such a design would degrade the quick change feature of the present preferred design.

In the preferred embodiment, once accelerator tube 10 is positioned in either half of the housing, the left and right housing halves 30, 32 are then swung closed by the operator using handles 42. The assembled housing and accelerator tube 10 are then ready for insertion into hydraulic cutter 50 where they will be placed in compressive, sealed engagement with cutter assembly 72 and compression collar 70 as is later described.

Now referring to FIGS. 5 and 6, shown is a hydraulic food cutter 50 with housing and accelerator tube 10 installed. A basic frame for hydraulic food cutter 50 is formed of base pan 52, and sides 54. This basic pan assembly is supported by leg assembly 58. Hinged to side 54 is closable top cover 56. The frame assembly for hydraulic food cutter 50 is designed to hold, in compressive and sealed engagement, a cutter assembly 72 and the housing formed of right housing half 30 and left housing half 32, which enclose and hold accelerator tube 10, between compression plate 62 at the discharge end and slideable compression collar 70 at the inlet end of the hydraulic food cutter 50.

Starting at the inlet, there is shown in FIGS. 5 and 6, inlet assembly coupler 64, which is bolted to compression plate 60 which, itself, is attached to the frame assembly for hydraulic food cutter 50. Also provided is a pair of pneumatic cylinders 66 operable to move cylinder rods 68. Cylinder rods 68 are attached to compression collar 70. When compression collar 70 is withdrawn, it releases any compressive forces on the accelerator tube assembly and the cutter assembly and provides sufficient clearance for an operator to reach in through an open top cover 56 to insert or remove cutter assembly 72 or the accelerator tub housing halves 30, 32. In the preferred embodiment, there is no clasp that holds right housing half 30 and left housing half 32 in a closed position. Instead, necessary compressive force to hold them in the closed position is provided by means of a pair of alignment springs 80, which are attached to sides 54. Thus, when the closed right housing half 30 and left housing half 32, which together encase accelerator tube 10, are positioned in hydraulic food cutter 50, the alignment springs 80 hold them in a closed position, yet still allow the entire to be slid back and forth as necessary for insertion or removal and for proper fit with cutter assembly 72. The detailed structure of cutter assembly 72 is not shown or described as it is well known in the art and is merely a housing that encases and holds a standard prior art cutting blade array assembly.

To seal the assembly, pneumatic cylinders 66 are activated to push compression collar 70 against inlet sealing surface flanges 36 formed on the inlet end of right and left housing halves 30, 32. When it does so, it engages and traps, between the compression collar 70 and inlet seal surface flanges 36, the inlet flange 18 of accelerator tube 10 in a compressive, water tight seal. Concurrently, the accelerator tube 10 and right and left housing halves 30, 32 are pushed forward and into engagement with the rear cutter assembly sealing collar 74, and in turn, cutter assembly 72 is pushed forward into compressive engagement, and front sealing collar 74 with compression plate 62. Attached to compression plate 62 is outlet coupler 76, which is interconnected to the remainder of the piping system.

Thus, when pneumatic cylinder 66 is engaged to force the compression collar forward, a number of things occur. First, watertight seals are formed between the various modules in preparation for use of the hydraulic food cutter 50. Secondly, and more importantly, outlet flange 22 of accelerator tube 10 is held in locked, compressive engagement between outboard sealing surface flanges 38 of right and left housing halves 30, 32, and the rear cutter assembly sealing collar 74. Not only does this provide a watertight seal, but it also locks the outlet 16 of accelerator tube 10 in position. Thus, accelerator tube 10 is supported at its inlet end by means of inlet flange 18 held in compressive engagement against the appropriate surfaces of right and left housing halves 30, 32 and compression collar 70, and by outlet flange 22 held in compressive engagement at the opposite end of the housing. Elsewhere throughout the housing, accelerator tube 10 is not supported other than by its own material structure. In this manner, conical tube 12 is free to expand and contract as it encounters uncut food product of various sizes and dimensions passing through it. Thus, greatly reducing the potential for plugging accelerator tube 10 with uncut food product. Also, this same freedom of movement and the resilient materials of which accelerator tube 10 is formed give it freedom of movement to expand and contract to contain and align tumbling uncut food product of various sizes entering the inlet 14 of accelerator tube 10.

Reinforcement spacer rings 26 are also provided and formed integral with conical tube 12. The reinforcement spacers 26 serve a number of functions in the preferred embodiment. They provide additional structural strength to enable the use of more flexible materials as described above. They all so serve to limit lateral deflection of accelerator tube 10 when a misaligned or oversized food product passes through the accelerator tube. As can be seen in the drawings, reinforcement spacers 26 are only found on the narrower portion of the outlet end of conical tube 12. In practice it has been found that they are not needed at the inlet end. The preferred design is shown most clearly in FIG. 4 wherein the reinforcement spacers 26 are configured as rings, formed integral with, and circumvolving, conical tube 12 and are appropriately sized so as to provide uniform spacing of reinforcement spacer tips 44 with the interior surfaces 42 of housing halves 30, 32. The actual spacing between tips 44 and the interior surfaces 42 of housing halves 30 and 32 is a matter of design choice related to the strength and flexibility of the material from which accelerator tube 10 is fabricated and the uniformity of size of the food product being cut. Also, the size of spacers 26 can be can be increased or decreased to maintain the same distance between tips 44 and interior surfaces 42 to facilitate the use of accelerator tubes 10 having different interior diameters within the same housing halves 30 and 32.

It should also be pointed out that the use of circumvolving rings as reinforcement spacers 26 is a matter of design choice for the preferred embodiment. Reinforcement spacers 26 could just as easily be formed as a series of longitudinal ribs extending radially out from conical tube 12, or even helical ribs extending out from conical tube 12. The fact that they are formed integral with conical tube 12 in the preferred embodiment is also a matter of design choice. They could be fabricated separately and somehow attached to accelerator tube 10. They could even be formed of a different material, or of a material more, or less, flexible than the material used to fabricate the conical tube. Again this is a design choice.

In practice, test runs cutting french fries from whole potatoes have revealed a substantial reduction in the percentage of misaligned cuts, broken pieces, and feathered cuts for the french fry shaped cut food pieces. This is believed to be the result of a number of factors that include, but may not be limited to the following: the more flexible material of which accelerator tube 10 is formed, as opposed to the stiffer and more rigid accelerator tubes of the prior art; the anchoring of the inlet and outlet ends of accelerator tube 10 in the manner provided to provide a accelerator tube that delivers an uncut food product to the cutter assembly in better alignment; and the use of a material which provides a more laminar, or at least less turbulent, water flow at the outlet end 16 of accelerator tube 10. As previously stated, accurate mathematical modeling of the hydrodynamics of the flow within accelerator tube 10 is not yet possible. While this is not yet possible, the empirical test results yield definite and positive improvements in the quality of the cut food product.

While there is shown and described the present preferred embodiment of the invention, it is to be distinctly understood that this invention is not limited thereto but may be variously embodied to practice within the scope of the following claims. From the foregoing description, it will be apparent that various changes may be made without departing from the spirit and scope of the invention as defined by the following claims.

I claim:

1. An accelerator tube assembly for use in a hydraulic food product cutting system which comprises:

an accelerator tube comprising a frustoconical tube having a first inlet end, a first outlet end smaller than said first inlet end, a first outside surface, and a first inside surface defining a passageway there-through for the passage of a suspension of food products in a fluid from said first inlet end to said first outlet end, said accelerator tube formed of a flexible material having a durometer hardness within the range of twenty to seventy;

an accelerator tube housing having a second inlet end, a second outlet end, and a second inner surface, and configured to receive said accelerator tube in spaced relationship to said second inside surface, said accelerator tube housing having an inlet sealing ring and an outlet sealing ring;

an inlet flange having first and second inlet flange surfaces, attached to and circumvolving said frustoconical tube near said first inlet end at a point wherein said first inlet flange surface will be in sealable engagement with said accelerator tube housing inlet sealing ring, said inlet flange formed of a flexible material having a durometer hardness within the range of twenty to seventy; and an outlet flange having first and second outlet flange surfaces, attached to and circumvolving said frustoconical tube near said first outlet end at a point wherein said first outlet flange surface will be in sealable engagement with said accelerator tube housing outlet sealing ring, said outlet flange formed of a flexible material having a durometer hardness within the range of twenty to seventy.

2. The accelerator tube assembly of claim 1 wherein said flexible material that said frustoconical tube is formed of rubber.

3. The accelerator tube assembly of claim 1 wherein said rubber material that said frustoconical tube is formed of polyurethane rubber.

4. The accelerator tube assembly of claim 1 wherein said flexible material that said inlet flange is formed of is rubber.

5. The accelerator tube assembly of claim 1 wherein said rubber material that said inlet flange is formed of is polyurethane rubber.

6. The accelerator tube assembly of claim 1 wherein said flexible material that said outlet flange is formed of is rubber.

7. The accelerator tube assembly of claim 1 wherein said rubber material that said outlet flange is formed of is polyurethane rubber.

8. The accelerator tube assembly of claim 1 which further comprises a plurality of reinforcing ribs attached to the first outside surface, said reinforcing ribs formed of a flexible material having a durometer hardness within the range of twenty to seventy.

9. The accelerator tube assembly of claim 8 wherein said flexible material that said reinforcing ribs are formed of is rubber.

10. The accelerator tube assembly of claim 8 wherein said rubber material that said reinforcing ribs are formed of is polyurethane rubber.

11. The accelerator tube assembly of claim 8 wherein said plurality of reinforcing ribs are configured as rings attached to and circumvolving said first outside surface.

12. The accelerator tube assembly of claim 11 wherein said plurality of reinforcing rings are configured to engage said second inside surface at a predetermined amount of deflection of said frustoconical tube.

13. The accelerator tube assembly of claim 8 wherein said plurality of reinforcing ribs are configured as a plurality of radially extending ribs attached to said first outside surface.

14. The accelerator tube assembly of claim 13 wherein said plurality of radially extending ribs are configured to engage the second inside surface at a predetermined amount of deflection of said frustoconical tube.

15. The accelerator tube assembly of claim 1 wherein said accelerator tube housing further includes an access door for insertion and removal of said frustoconical tube.

16. The accelerator tube assembly of claim 1 wherein said accelerator tube housing further a pair of closeable housing halves.

17. An accelerator tube for use within an accelerator tube housing having a first inlet end, a first outlet end, a first outside surface, and a first inside surface, and configured to receive in spaced relationship said accelerator tube, said accelerator tube housing having an inlet sealing ring and an outlet sealing ring, said accelerator tube comprising:

a frustoconical tube, having an second outside surface, and a second inside surface defining a passageway there-through for the passage of a suspension of food products in a fluid from a second inlet end to a second outlet end that is smaller than said second inlet end, said frustoconical tube formed of a flexible material having a durometer hardness within the range of twenty to seventy;

an inlet flange having first and second inlet flange surfaces, attached to and circumvolving said frustoconical tube near said second inlet end at a point wherein said first inlet flange surface will be in sealable engagement with said accelerator tube housing inlet sealing ring, said inlet flange formed of a flexible material having a durometer hardness within the range of twenty to seventy; and an outlet flange having first and second outlet flange surfaces, attached to and circumvolving said frustoconical tube near said second outlet end at a point wherein said first outlet flange surface will be in sealable engagement with said accelerator tube housing outlet sealing ring, said outlet flange formed of a flexible material having a durometer hardness within the range of twenty to seventy.

18. The accelerator tube assembly of claim 17 wherein said flexible material that said frustoconical tube is formed of rubber.

19. The accelerator tube assembly of claim 17 wherein said rubber material that said frustoconical tube is formed of polyurethane rubber.

20. The accelerator tube assembly of claim 17 wherein said flexible material that said inlet flange is formed of is rubber.

21. The accelerator tube assembly of claim 17 wherein said rubber material that said inlet flange is formed of is polyurethane rubber.

22. The accelerator tube assembly of claim 17 wherein said flexible material that said outlet flange is formed of is rubber.

23. The accelerator tube assembly of claim 17 wherein said rubber material that said outlet flange is formed of is polyurethane rubber.

24. The accelerator tube assembly of claim 17 which further comprises a plurality of reinforcing ribs attached to said second outside surface, said reinforcing ribs formed of a flexible material having a durometer hardness within the range of twenty to seventy.

25. The accelerator tube assembly of claim 24 wherein said plurality of reinforcing ribs are configured as rings attached to and circumvolving said second outer surface.

26. The accelerator tube assembly of claim 25 wherein said plurality of reinforcing rings are configured to engage the first inside surface at a predetermined amount of deflection of said frustoconical tube.

27. The accelerator tube assembly of claim 25 wherein said plurality of reinforcing ribs are configured as a plurality of radially extending ribs attached to the second outer surface.

28. The accelerator tube assembly of claim 27 wherein said plurality of radially extending ribs are configured to engage the first inside surface at a predetermined amount of deflection of said frustoconical tube.

29. The accelerator tube assembly of claim 24 wherein said flexible material that said reinforcing ribs are formed of is rubber.

30. The accelerator tube assembly of claim 24 wherein said rubber material that said reinforcing ribs are formed of is polyurethane rubber.

* * * * *